United States Patent
Shuai et al.

(10) Patent No.: US 12,548,839 B2
(45) Date of Patent: Feb. 10, 2026

(54) BATTERY STORAGE DEVICE AND OILING METHOD

(71) Applicant: CONTEMPORARY AMPEREX TECHNOLOGY (HONG KONG) LIMITED, Hong Kong (CN)

(72) Inventors: Ling Shuai, Ningde (CN); Kangyu Wang, Ningde (CN); Qingming Wang, Ningde (CN); Xia Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 188 days.

(21) Appl. No.: 18/213,722

(22) Filed: Jun. 23, 2023

(65) Prior Publication Data

US 2023/0327261 A1 Oct. 12, 2023

Related U.S. Application Data

(63) Continuation of application No. PCT/CN2021/121411, filed on Sep. 28, 2021.

(51) Int. Cl.
*H01M 50/244* (2021.01)
*H01M 50/249* (2021.01)

(52) U.S. Cl.
CPC ....... *H01M 50/244* (2021.01); *H01M 50/249* (2021.01); *H01M 2220/20* (2013.01)

(58) Field of Classification Search
CPC ............. H01M 50/244; H01M 50/249; H01M 50/204; H01M 50/20; H01M 2220/20;
(Continued)

(56) References Cited

U.S. PATENT DOCUMENTS 5,545,967 A * 8/1996 Osborne ............... H02J 7/0013
320/109
2002/0022409 A1 2/2002 Caridei

FOREIGN PATENT DOCUMENTS

CN 206422106 * 8/2017 ............. Y02E 60/10
CN 206422106 U 8/2017
(Continued)

OTHER PUBLICATIONS

English translation of CN212143226.*
(Continued)

*Primary Examiner* — Kiran Quraishi Akhtar
(74) *Attorney, Agent, or Firm* — XSENSUS LLP

(57) ABSTRACT

The present application relates to a battery storage device and an oiling method, and belongs to the technical field of battery overhauling and maintenance. The present application provides a battery storage device for storing a battery and charging the battery, and the battery has a connecting element for being connected to an electrical apparatus. The battery storage device includes: a battery placement rack; and an oiling mechanism arranged on the battery placement rack and used for oiling the connecting element. The present application further provides an oiling method. By using the battery storage device and the oiling method provided in the present application, the connecting element of the battery can be oiled and maintained, and the service life of the connecting element of the battery is prolonged.

9 Claims, 11 Drawing Sheets

(58) Field of Classification Search
CPC ....... H01M 2250/20; B60K 2001/0438; B60K 2001/0494; B60K 1/04; B66C 1/30; B60L 53/80; B05C 1/02; B05C 1/06; B05C 5/02; B60S 5/06; Y02T 10/70; Y02T 10/7072; Y02E 60/10
See application file for complete search history.

(56) References Cited

FOREIGN PATENT DOCUMENTS

| | | | | |
|---|---|---|---|---|
| CN | 108767164 | A | | 11/2018 |
| CN | 209318027 | U | | 12/2018 |
| CN | 210133095 | U | | 3/2020 |
| CN | 111301357 | A | | 6/2020 |
| CN | 210753452 | U | | 6/2020 |
| CN | 212143226 | * | 12/2020 | ............... B05C 1/02 |
| CN | 212143226 | U | | 12/2020 |
| CN | 212571278 | U | | 2/2021 |
| EP | 3725605 | A1 | | 10/2020 |
| JP | H04-138664 | A | | 5/1992 |
| JP | 2004-255300 | A | | 9/2004 |
| JP | 2009050076 | A | | 3/2009 |
| JP | 2020-508930 | A | | 3/2020 |
| JP | 2020-057449 | A | | 4/2020 |
| JP | 2021-099336 | A | | 7/2021 |

OTHER PUBLICATIONS

English translation of CN206422106.*
Extended European Search Report issued Mar. 15, 2024 in European Patent Application No. 21958678.1.
Notice of Reasons for Refusal Issued May 21, 2024 in Japanese Patent Application No. 2023-519056 with English translation thereof.
International Search Report and Written Opinion PCT/CN2021/121411, Apr. 28, 2022, 11 pgs.

* cited by examiner

BATTERY STORAGE DEVICE AND OILING METHOD

CROSS-REFERENCE TO RELATED APPLICATION

The application is a continuation application of PCT Patent Application No. PCT/CN2021/121411, entitled "BATTERY STORAGE DEVICE AND OILING METHOD" filed on Sep. 28, 2021, which is incorporated herein by reference in its entirety.

TECHNICAL FIELD

The present application relates to the technical field of battery overhauling and maintenance, in particular to a battery storage device and an oiling method.

BACKGROUND ART

With rapid development of a new energy vehicle, supporting facilities related to the new energy vehicle are also constantly improving to provide a battery replacement service for a battery of the new energy vehicle and battery maintenance.

Since the battery needs to be disassembled and assembled for battery replacement or maintenance, a connecting element of the battery will accelerate aging and wear after repeated disassembly and assembly, resulting in failure of the battery to be firmly connected to a vehicle body, and a certain potential safety hazard.

SUMMARY OF THE INVENTION

To this end, the present application provides a battery storage device and an oiling method, which can perform oiling maintenance on a connecting element of a battery and prolong service life of the connecting element of the battery.

An embodiment of a first aspect of the present application provides a battery storage device for storing a battery and charging the battery, and the battery has a connecting element for being connected to an electrical apparatus. The battery storage device includes: a battery placement rack; and an oiling mechanism, arranged on the battery placement rack, used for oiling the connecting elements.

The battery is placed on the battery placement rack, and the oiling mechanism is used to oil the connecting element of the battery, which can lubricate the connecting element of the battery and prolong the service life of the connecting element. After the battery is disassembled from a vehicle body, not only the connecting element is oiled, but also the battery is charged, so that the number of times of disassembly and assembly of the battery and the electrical apparatus can be reduced, aging and wear of the connecting element are alleviated, and the service life of the connecting element is prolonged.

According to some embodiments of the present application, the oiling mechanism includes a housing and an oiling element, the oiling element is arranged in the housing, and the housing has an opening into which the connecting element extends.

In the above solution, the oiling mechanism is close to the connecting element of the battery, so that the connecting element extends into the housing from the opening, and the connecting element is in contact with the oiling element inside the housing. Through this structural form, not only can lubricating oil dripping and polluting an external environment be avoided, but also loss caused by volatilization of the lubricating oil can be alleviated.

According to some embodiments of the present application, the housing is provided with an oil filling port for filling oil into the housing to wet the oiling element.

In the above solution, the oil is filled into the housing through the oil filling port, so that the oiling element can be wetted, and the connecting element can be effectively oiled when the oiling element is in contact with the connecting element of the battery.

According to some embodiments of the present application, a material of the oiling element is sponge, felt or cotton cloth.

In the above solution, the sponge, the felt or the cotton cloth are all materials with strong water absorption, which can store a large amount of lubricating oil, effectively oil the connecting element, and can further reduce the number of times of oil replenishment.

According to some embodiments of the present application, the battery storage device further includes: a driving mechanism arranged on the battery placement rack, the oiling mechanism is connected to an output end of the driving mechanism, and the driving mechanism is used for driving the oiling mechanism to move, so as to switch the oiling mechanism between a working position and a non-working position.

In the above solution, through the driving mechanism, the oiling mechanism can be driven to switch between the working position and the non-working position. When the oiling mechanism is located in the working position, the oiling mechanism oils the connecting element of the battery; and when the oiling mechanism is located in the non-working position, the oiling mechanism is far away from the connecting element of the battery, so as to avoid a space required when the battery is loaded to the battery placement rack and taken out of the battery placement rack.

According to some embodiments of the present application, the battery storage device further includes: a position adjustment mechanism arranged on the battery placement rack, and the position adjustment mechanism is used for adjusting a position of the driving mechanism on the battery placement rack.

In the above solution, the position of the driving mechanism on the battery placement rack can be adjusted through the position adjustment mechanism, thereby driving the oiling mechanism to move relative to the battery placement rack, so that the oiling mechanism has a plurality of working positions to adapt to batteries of different specifications.

According to some embodiments of the present application, the battery storage device further includes: an oil replenishing mechanism arranged on the battery placement rack and used for replenishing the oil for the oiling mechanism.

In the above solution, by arranging the oil replenishing mechanism, the oil can be replenished for the oiling mechanism, so that the oiling element has the enough lubricating oil, and when the oiling element is in contact with the connecting element of the battery, the connecting element can be effectively oiled.

According to some embodiments of the present application, the oil replenishing mechanism includes: an oil filling device, arranged on the battery placement rack; and an oil replenishing pipe, with two ends thereof respectively communicating with the oil filling device and the oiling mechanism, wherein the oil filling device is configured to fill the oil into the oiling mechanism through the oil filling pipe.

In the above solution, the oil filling device fills the oil into the oiling mechanism through the oil replenishing pipe, which can realize automatic oil replenishing and improve an oil replenishing efficiency of the oiling mechanism, and the lubricating oil will not drip and pollute the external environment.

According to some embodiments of the present application, there are multiple oiling mechanisms, and each oiling mechanism corresponds to one connecting element of the battery.

In the above solution, each oiling mechanism oils one connecting element of the battery, and the plurality of oiling mechanisms can be used to oil the connecting elements of the battery at the same time, thereby improving the oiling efficiency.

According to some embodiments of the present application, the battery placement rack has a buffer compartment and a charging compartment, the buffer compartment is used for storing the battery, the charging compartment is used for storing the battery and charging the battery, and the oiling mechanism is arranged in the buffer compartment.

In the above solution, the buffer compartment is provided with the oiling mechanism, and the oiling mechanism oils the connecting element of the battery placed in the buffer compartment, which can not only reduce the arrangement quantity of the oiling mechanism, but also make the oiling mechanism be arranged far away from a charging module, thereby improving safety of the battery storage device.

An embodiment of a second aspect of the present application provides an oiling method, including:

placing a battery in a battery placement rack; and oiling a connecting element of the battery, wherein the connecting element is used for being connected to an electrical apparatus.

In the above solution, the battery is placed on the battery placement rack, and the connecting element of the battery is oiled by using the oiling mechanism, which can lubricate and maintain the connecting element of the battery and prolong service life of the connecting element. After the battery is disassembled from a vehicle body, not only the connecting element is oiled, but also the battery is charged, so that the number of times of disassembly and assembly of the battery and the electrical apparatus can be reduced, aging and wear of the connecting element are alleviated, and the service life of the connecting element is prolonged.

According to some embodiments of the present application, the battery placement rack has a buffer compartment and a charging compartment, the buffer compartment is used for storing the battery, and the charging compartment is used for storing the battery and charging the battery.

The oiling method includes:

oiling the connecting element when the battery is placed in the buffer compartment.

In the above solution, the buffer compartment is provided with the oiling mechanism, and the oiling mechanism oils the connecting element of the battery placed in the buffer compartment, which can not only reduce the arrangement quantity of the oiling mechanism, but also make the oiling mechanism be arranged far away from a charging module, thereby improving safety of the battery storage device.

Additional aspects and advantages of the present application will be set forth, in part, from the following description, and in part will become apparent from the following description, or may be learned by practice of the present application.

DESCRIPTION OF DRAWINGS

In order to illustrate the technical solutions of the embodiments of the present application more clearly, the following briefly introduces the drawings required in the embodiments of the present application. It should be understood that the following drawings only show some embodiments of the present application, and thus should not be regarded as limitation to the scope. For those of ordinary skill in the art, other related drawings can further be obtained according to these drawings without any creative effort.

Figure 1:
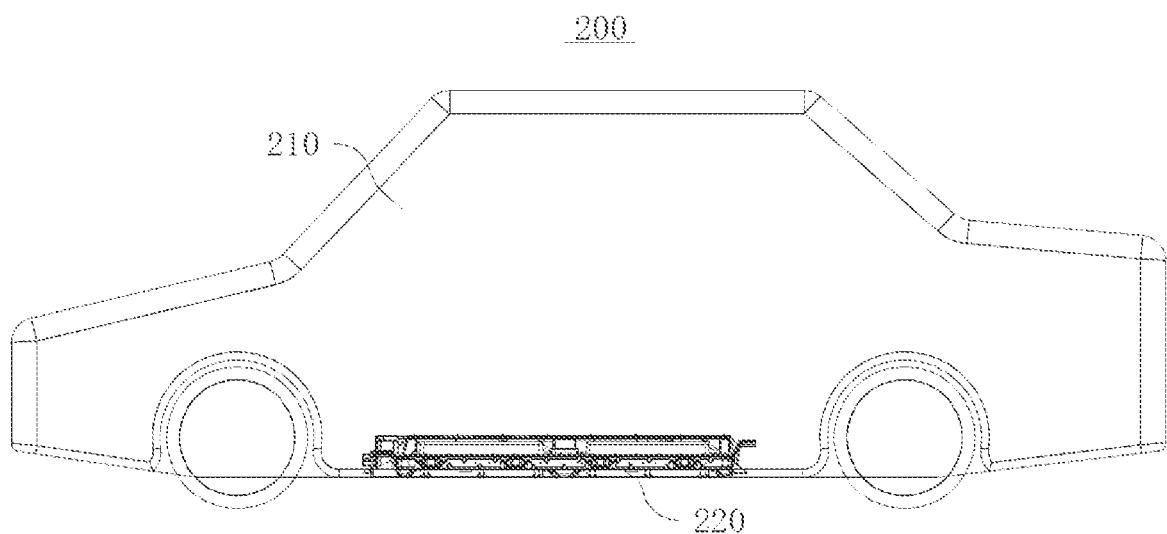
FIG. 1 shows a simplified diagram of a vehicle to which a battery storage device provided in some embodiments of the present application is applicable.

The above drawings are not drawn to scale.

Icons: 100—battery storage device; 110—battery placement rack; 111—rack body; 1111—operation space; 112—buffer compartment; 113—charging compartment; 114—lifting assembly; 1141—lifting block; 11411—first end; 11412—second end; 1142—second bracket; 1143—rotating shaft; 1144—in-place sensor; 120—oiling mechanism; 121—housing; 1211—opening; 1212—connecting element; 1213—oil filling port; 1214—oil replenishing channel; 1215—oiling cavity; 122—oiling element; 130—driving mechanism; 140—position adjustment mechanism; 141—first bracket; 150—oil replenishing mechanism; 151—oil filling device; 152—oil replenishing pipe; 200—vehicle; 210—vehicle body; 220—battery; 221—connecting element; and 222—box.

DETAILED DESCRIPTION

To make the objective, technical solutions and advantages of the embodiments of the present application more clear, the technical solutions in the embodiments of the present application will be clearly described below with reference to the drawings in the embodiments of the present application. Obviously, the embodiments described are some of rather than all of the embodiments of the present application. Based on the embodiments in the present application, all other embodiments obtained by those of ordinary skill in the art without creative effort fall within the protection scope of the present application.

Unless otherwise defined, all technical and scientific terms used in the present application have the same meanings as those commonly understood by those skilled in the art to which the present application belongs. The terms used in the specification of the present application are merely for the purpose of describing specific embodiments, but are not intended to limit the present application. The terms "comprising" and "having" and any variations thereof in the specification and the claims of the present application as well as the foregoing description of the drawings are intended to cover non-exclusive inclusions. The terms "first", "second" and the like in the specification and the claims of the present application as well as the above drawings are used to distinguish different objects, rather than to describe a specific order or primary-secondary relationship.

Reference herein to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is understood explicitly and implicitly by those skilled in the art that the embodiments described in the present application can be combined with other embodiments.

In the description of the present application, it should be noted that the terms "mounting", "connecting", "connection" and "attachment" should be understood in a broad sense, unless otherwise explicitly specified or defined. For example, it may be a fixed connection, a detachable connection, or an integrated connection; and it may be a direct connection or an indirect connection through an intermediate medium, or may be a communication between the interior of two elements. For those of ordinary skill in the art, the specific meanings of the above terms in the present application can be understood according to specific situations.

"A plurality of" appeared in the present application refers to two or more (including two).

It may be understood that a battery refers to a single physical module that includes one or more battery cells to provide higher voltage and capacity. For example, the battery mentioned in the present application may include a battery module, a battery pack, or the like. The battery generally includes a box for packaging one or more battery cells. The box can prevent liquid or other foreign matters from affecting charging or discharging of the battery cells.

It should be understood that the battery cell may include a lithium-ion secondary battery, a lithium-ion primary battery, a lithium-sulfur battery, a sodium-lithium-ion battery, a sodium-ion battery, or a magnesium-ion battery, etc., which is not limited in the embodiments of the present application. The battery cell may be cylindrical, flat, rectangular, or in other shapes, which is also not limited in the embodiments of the present application. The battery cell is generally divided into three types according to packaging manners: a cylindrical battery cell, a square battery cell, and a pouch cell. The battery cell includes an electrode assembly and an electrolyte solution, and the electrode assembly is composed of a positive electrode sheet, a negative electrode sheet and a separator. The battery cell works mainly relying on the movement of metal ions between the positive electrode sheet and the negative electrode sheet. The positive electrode sheet includes a positive electrode current collector and a positive electrode active material layer, a surface of the positive electrode current collector is coated with the positive electrode active material layer, the positive electrode current collector not coated with the positive electrode active material layer protrudes from the positive electrode current collector already coated with the positive electrode active material layer, and the positive electrode current collector not coated with the positive electrode active material layer is used as a positive electrode tab. Taking a lithium-ion battery as an example, a material of the positive current collector may be aluminum, and positive electrode active material may be lithium cobalt oxide, lithium iron phosphate, ternary lithium, lithium manganate, or the like. The negative electrode sheet includes a negative electrode current collector and a negative electrode active material layer, a surface of the negative electrode current collector is coated with the negative electrode active material layer, the negative electrode current collector not coated with the negative electrode active material layer protrudes from the negative electrode current collector already coated with the negative electrode active material layer, and the negative electrode current collector not coated with the negative electrode active material layer is used as a negative electrode tab. A material of the negative electrode current collector may be copper, and negative electrode active material may be carbon, silicon, or the like. The electrode assembly may be of a wound structure or a laminated structure, which is not limited in the embodiments of the present application.

Figure 2:
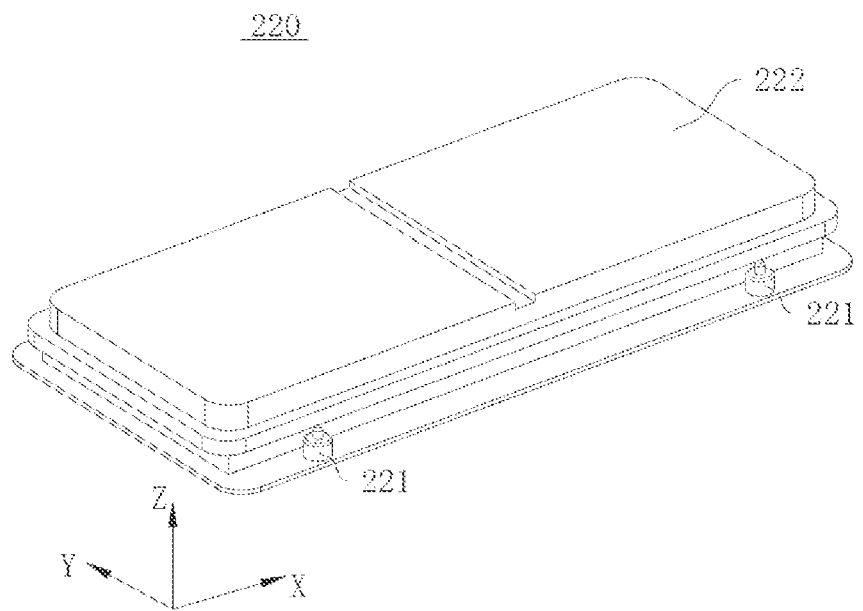
FIG. 2 shows a schematic structural diagram of a battery of the vehicle in FIG. 1.

FIG. 1 shows a simplified diagram of a vehicle to which a battery storage device provided in some embodiments of the present application is applicable. FIG. 2 shows a schematic structural diagram of a battery of the vehicle in FIG. 1.

As shown in FIG. 1 and FIG. 2, in the related art, the vehicle 200 includes a vehicle body 210 and a battery 220, and the battery 220 is used to provide the vehicle 200 with electrical energy. The battery 220 includes a plurality of connecting elements 221, and the plurality of connecting elements 221 are mounted on a box 222 of the battery 220. The vehicle body 210 has fixing parts corresponding to the connecting elements 221, and the connecting elements 221 are connected to the fixing parts to mount the battery 220 on the vehicle body 210.

When the electrical energy of the battery 220 of the vehicle 200 is insufficient, the depleted battery 220 needs to be disassembled from the vehicle body 210 for charging, and the fully charged battery 220 needs to be replaced and assembled back into the vehicle body 210 to provide electrical energy for the vehicle 200 to continue running. After the battery 220 is disassembled and assembled for many times, its connecting elements 221 will accelerate aging and wear, resulting in that the battery 220 cannot be firmly connected to the vehicle body. During a running process of the vehicle 200, in the case of bumps and vibrations, the battery 220 may be separated from the vehicle body 210, resulting in a security incident.

The inventor found through research that, in a process of replacing the battery 220 for the vehicle 200, a disassembly and assembly of the battery 220 will inevitably result. In a state that the battery 220 is separated from the vehicle body 210, the connecting elements 221 of the battery 220 are exposed, thus the surfaces of the connecting elements 221 are oiled easily to realize maintenance of the connecting elements 221 and prevent the connecting elements 221 from rusting, thereby improving service life of the connecting elements 221.

Based on the above thought, the present application provides a new technical solution, which can perform oiling maintenance on the connecting elements 221 of the battery 220, thereby prolonging the service life of the connecting elements 221 of the battery 220.

Figure 3:
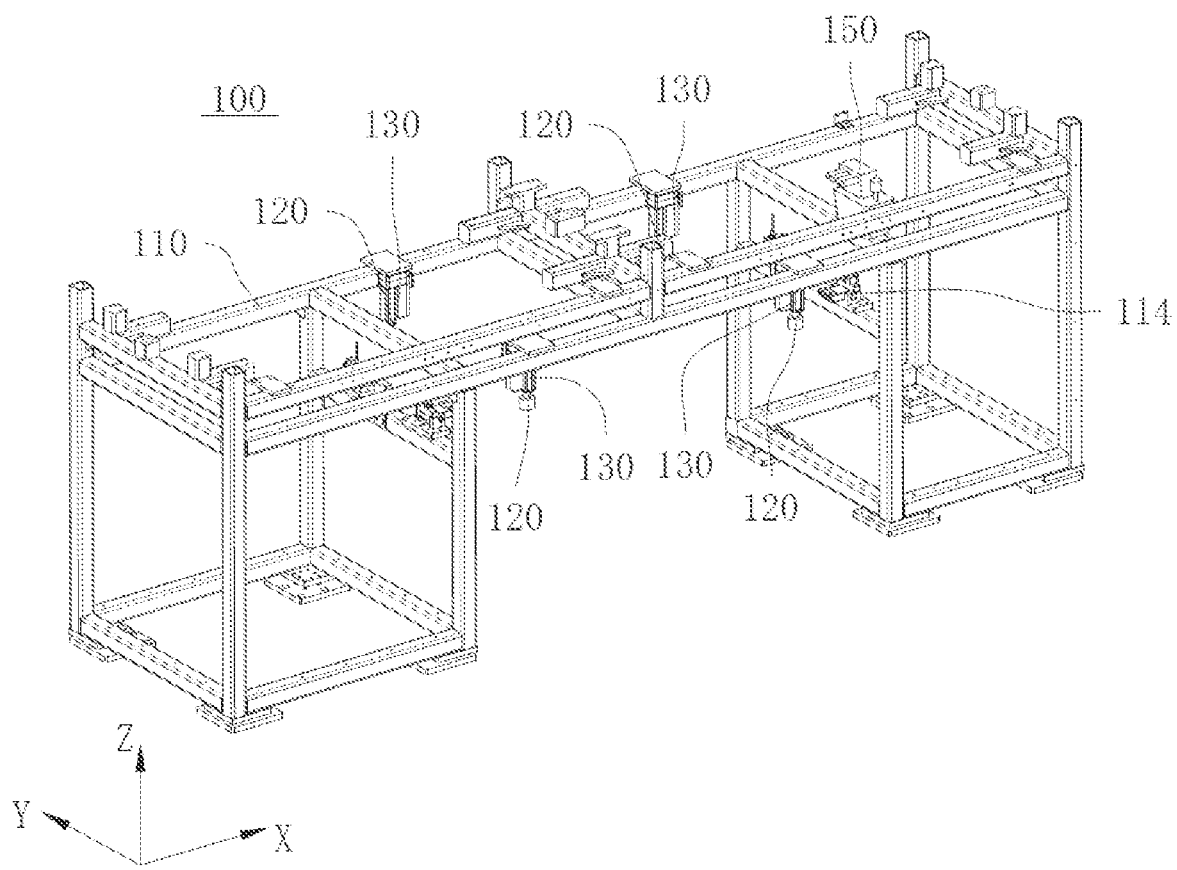
FIG. 3 shows a schematic structural diagram of a first form of battery storage device provided by some embodiments of the present application.

FIG. 3 shows a schematic structural diagram of a first form of battery storage device provided in some embodiments of the present application.

As shown in FIG. 2 and FIG. 3, some embodiments of the present application provide a battery storage device 100, including a battery storage rack 110, a battery replacement platform, a first transfer mechanism, a second transfer mechanism, and a charging module (not shown in the figures). The battery placement rack 110 is used to store a battery 220, the charging module is used to charge the battery 220 placed on the battery placement rack 110, and the battery replacement platform is used to place the vehicle of which the battery 220 is to be replaced. The first transfer mechanism is used to remove the depleted battery 220 from the vehicle body, transfer it to the battery placement rack 110, transfer the fully charged battery 220 to the battery replacement platform, and mount the fully charged battery 220 back into the vehicle body. The second transfer mechanism is used to take out the depleted battery 220 from an output end of the first transfer mechanism, put it into the battery placement rack 110, take out one fully charged battery 220 from the battery placement rack 110 and place it at the output end of the first transfer mechanism.

The battery replacement platform may have a predetermined battery replacement position, and the first transfer mechanism is in butt joint with the battery replacement position. When the vehicle is parked at the battery replacement position, an execution end of the first transfer mechanism extends into a bottom of the vehicle body 210 and exerts force on a connecting element 221 of the battery 220 to separate the battery 220 from the vehicle body 210. The disassembly and assembly of the battery 220 and the vehicle body 210 may be executed mechanically by the output end of the first transfer mechanism or another manipulator, or the disassembly and assembly may be completed manually. The first transfer mechanism may be an RGV trolley, or a three-line manipulator or the like. The second transfer mechanism may be a palletizer or a fork, or a three-straight-line manipulator or the like. The charging module may be integrated into the battery placement rack 110, or may be arranged independently from the battery placement rack 110.

It can be understood that the battery 220 can be used as an operating power source of the vehicle 200, and the battery 220 can also be used as a driving power source of the vehicle 200, and the like. The vehicle 200 may be a fuel vehicle, a gas vehicle, or a new energy vehicle, and the new energy vehicle may be an all-electric vehicle, a hybrid electric vehicle, an extended range electric vehicle, or the like.

It can be understood that the battery 220 cell described in the embodiment of the present application or an electrical apparatus to which the battery 220 is applicable is not limited to a vehicle, and may also be in various forms. For example, the electrical apparatus may be, for example, a mobile phone, a portable device, a laptop computer, an electromobile, a ship, a spacecraft, an electric toy, an electric tool, and the like.

It can be understood that the connecting element 221 may be a bolt-type locking mechanism, a bolt, a buckle or other forms of metal parts. The connecting element 221 may be connected to the battery 220 in a form of welding or threaded connection, or may be directly formed on the box 222 of the battery 220. The battery 220 may include the plurality of connecting elements 221 for jointly mounting the battery 220 to the vehicle body 210.

As shown in FIG. 2 and FIG. 3, the battery storage device 100 of the embodiment of the present application is used for storing the battery 220 and charging the battery 220, and the battery 220 has the connecting element 221 for being connected to the vehicle body 210 of the vehicle 200. The battery storage device 100 includes a battery placement rack 110 and an oiling mechanism 120. The oiling mechanism 120 is arranged on the battery placement rack 110 and is used for oiling the connecting element 221.

The battery storage device 100 is used for storing the battery 220 and charging the battery 220, and can also be used for storing the battery 220 and performing maintenance or overhauling on the battery 220.

The battery placement rack 110 may be formed by assembling aluminum alloy profiles, or may be formed by assembling aluminum alloy profiles combined with plates. In the battery storage rack 110, the battery 220 may be stored and charged at the same position, or the battery 220 may be stored and charged at different positions.

The oiling mechanism 120 may oil the connecting element 221 of the battery 220 stored in the battery placement rack 110, and may also oil the connecting element 221 of the battery 220 stored in the battery placement rack 110 and being charged. The oiling mechanism 120 may have a working position and a non-working position, and the oiling mechanism 120 only moves to the working position when the connecting element 221 needs to be oiled; and the oiling mechanism 120 may also be fixedly arranged at the working position to oil the connecting element 221 in the form of dripping oil or moving the battery 220. The oiling mechanism 120 may be fixedly arranged on the battery placement rack 110, or may be arranged on the battery placement rack 110 in a position-adjustable manner to adapt to sizes of the batteries 220 of different specifications.

The battery 220 is placed on the battery placement rack 110, and the oiling mechanism 120 is used to oil the connecting element 221 of the battery 220, which can lubricate the connecting element 221 of the battery 220 and prolong the service life of the connecting element 221. After the battery 220 is disassembled from the vehicle body 210, not only the connecting element 221 is oiled, but also the battery 220 is charged, so that the number of times of disassembly and assembly of the battery 220 and the vehicle body 210 can be reduced, aging and wear of the connecting element 221 are alleviated, and the service life of the connecting element 221 is prolonged.

In some embodiments of the present application, there are multiple oiling mechanisms 120, and each oiling mechanism 120 corresponds to one connecting element 221 of the battery 220.

As shown in FIG. 2 and FIG. 3, specifically, the battery 220 includes the four connecting elements 221, and the four connecting elements 221 are arranged in a rectangular array. The four connecting elements 221 all protrude from an upper surface of the battery 220, and the battery 220 is jointly fixed to the vehicle body through the four connecting elements 221. There are also four oiling mechanisms 120 arranged, the four oiling mechanisms 120 are arranged in a rectangular array, and each oiling mechanism 120 corresponds to one connecting element 221.

In other embodiments, the quantity of the oiling mechanism 120 may also be one, and by moving the position of the oiling mechanism 120, the plurality of connecting elements 221 of the battery 220 are oiled one by one.

In the above solution, each oiling mechanism 120 oils one connecting element 221 of the battery 220, and the plurality of oiling mechanisms 120 can be used to oil the connecting elements 221 of the battery 220 at the same time, thereby improving the oiling efficiency.

Figure 4:
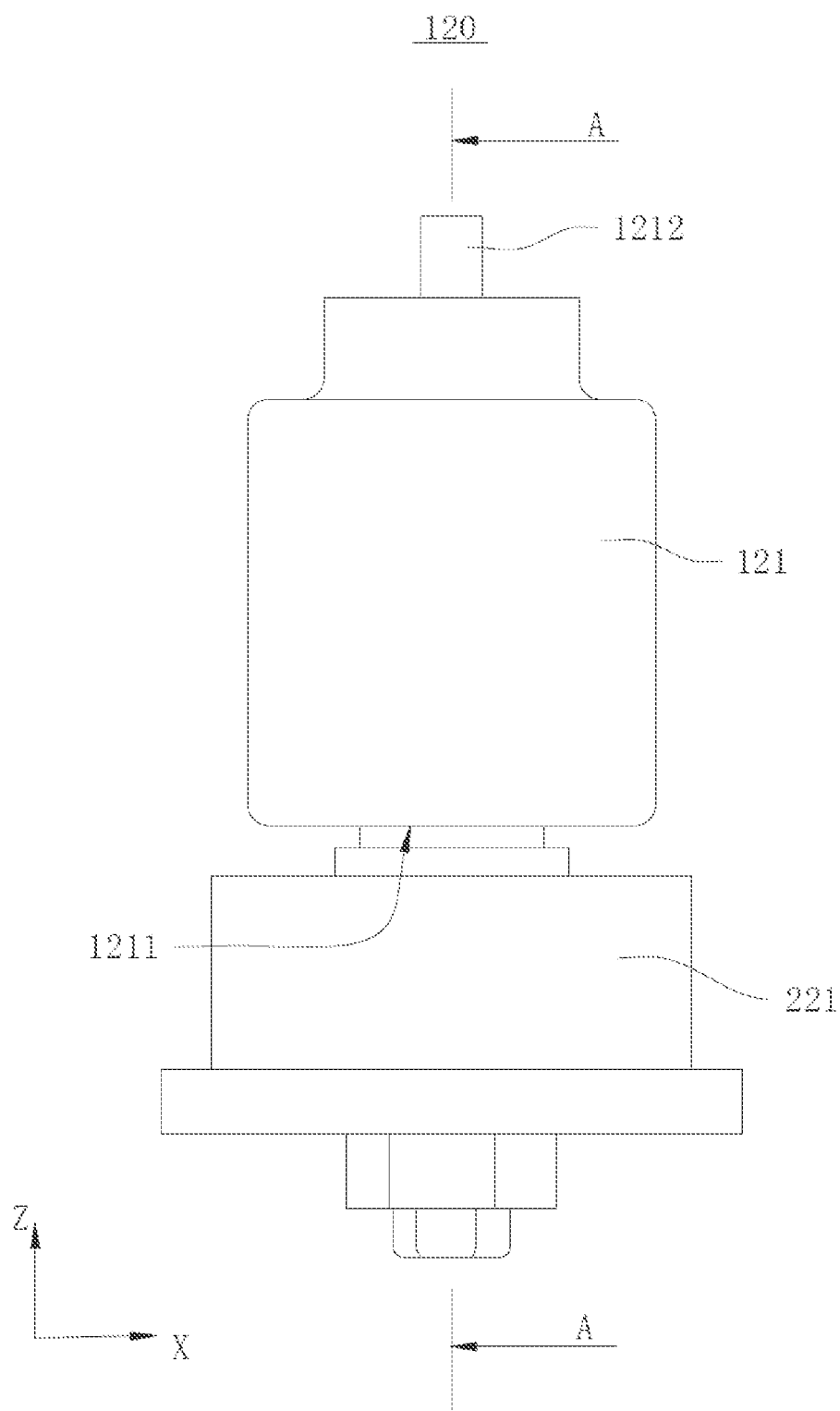
FIG. 4 shows a schematic structural diagram of an oiling mechanism of a battery storage device provided by some embodiments of the present application.
Figure 5:
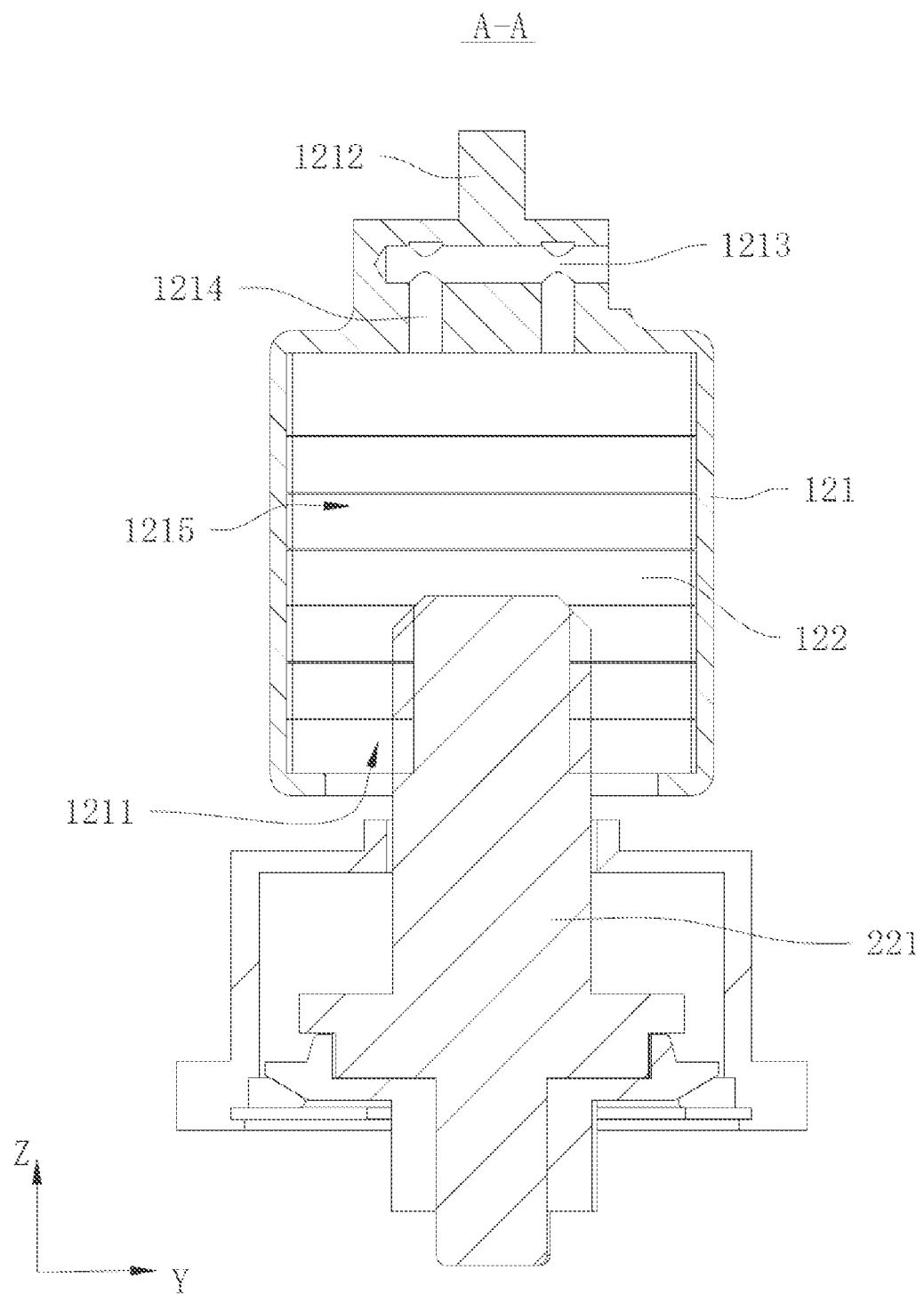
FIG. 5 is a A-A sectional view in FIG. 4.

FIG. 4 shows a schematic structural diagram of an oiling mechanism of a battery storage device provided by some embodiments of the present application. FIG. 5 is an A-A sectional view in FIG. 4.

As shown in FIG. 4 and FIG. 5, in some embodiments of the present application, the oiling mechanism 120 includes a housing 121 and an oiling element 122, the oiling element 122 is arranged in the housing 121, and the housing 121 has an opening 1211 into which the connecting element 221 extends.

The housing 121 may be an injection-molded plastic part, or a cast-molded metal part. The opening 1211 is formed in a lower side of the housing 121 to expose a lower surface of the oiling element 122. On the one hand, most of the connecting elements 221 are arranged on the upper surface of the battery 220, and this structural form enables the connecting elements 221 of the battery 220 to be inserted into the oiling element 122 from the lower side. On the other hand, lubricating oil mainly wets a lower part of the oiling element 122 due to the action of gravity, so that oiling amount to the connecting element 221 can be increased. In other embodiments, the opening 1211 may also be formed in a peripheral side of the housing 121 to adapt a circumstance that the peripheral side of the connecting element 221 protrudes from the battery 220. A shape of the opening 1211 may be a square, a circle or other shapes for the connecting element 221 to extend.

An outer side of the housing 121 further includes a connecting portion 1212, the connecting portion 1212 is used to directly or indirectly connect with the battery placement rack 110, and the connecting portion 1212 may be a threaded part or a nut. The connecting portion 1212 is arranged on one side of the housing 121 far away from the opening 1211 to provide a large space near the opening 1211, so that outer dimension of the peripheral side of the housing 121 is small, and other structures on the surface of the battery 220 are avoided to be close to the connecting element 221. In other embodiments, the connecting portion 1212 may also be arranged on the outer peripheral side of the housing 121 to reduce the outline dimension of the housing 121 in terms of height.

The oiling element 122 may be a flexible wetted element and stores lubricating oil in a wetted form. The connecting element 221 extends into the interior of the housing 121 from the opening 1211 of the housing 121 to insert the wetted element, and the wetted element is deformed by extrusion to extrude the lubricating oil onto the connecting element 221. The oiling element 122 may also be a spray gun with an oil storage compartment. The spray gun is fixed inside the housing 121. After the connecting element 221 extends into the interior of the housing 121 from the opening 1211 of the housing 121, the spray gun sprays oil to the surface of the connecting element 221.

The lower side of the oiling element 122 may be provided with a groove corresponding to the opening 1211, so as to facilitate extension of the connecting element 221. The lower side of the oiling element 122 may also be flush, so that the oiling element 122 is fully extruded when the connecting element 221 extends into the opening 1211.

In other embodiments, the housing 121 may not be provided with the opening 1211, and the oiling element 122 is completely exposed to the outside of the housing 121, so as to be flexibly contacted with the connecting element 221 for oiling, and conveniently replenish the oil to the oiling element 122 in time.

The opening 1211 is formed in the oiling mechanism 120 near the connecting element 221 of the battery 220, so that the connecting element 221 extends into the housing 121 from the opening 1211, and the connecting element 221 makes contact with the oiling element 122 inside the housing 121. Through this structural form, not only can lubricating oil dripping and polluting an external environment be avoided, but also loss caused by volatilization of the lubricating oil can be alleviated.

As shown in FIG. 5, in some embodiments of the present application, the housing 121 is provided with an oil filling port 1213 for filling the oil into the housing 121 to wet the oiling element 122.

Specifically, the housing 121 has an oiling cavity 1215 inside, the oiling cavity 1215 communicates with the opening 1211, the oiling element 122 is arranged in the oiling cavity 1215, and the housing 121 is internally provided with an oil replenishing channel 1214. One end of the oil replenishing channel 1214 communicates with the oiling cavity 1215, and the other end penetrates through the outer side of the housing 121 and forms the oil filling port 1213. Along a direction from the oil filling port 1213 to the oiling cavity 1215, the oil replenishing channel 1214 extends downward, so that the lubricating oil enters the oiling cavity 1215 under the action of gravity, and then enters the oiling element 122.

The oil filling port 1213 may be connected to the following oil replenishing mechanism 150 (please refer to FIG. 1), and the oiling element 122 may replenished with oil through the oil replenishing mechanism 150. A flared flow guide element may also be connected to the oil filling port 1213, so that the lubricating oil easily enters the oil replenishing channel 1214 from the oil filling port 1213.

In other embodiments, the oil filling port 1213 may not be provided, the oiling element 122 is taken out to replenish the oil for the oiling element 122, and then the oiling element 122 after oil replenishment is put back into the interior of the housing 121.

The oil is filled into the housing 121 through the oil filling port 1213, so that the oiling element 122 can be wetted without disassembling the oiling element 122, and the connecting element 221 can be effectively oiled when the oiling element 122 is in contact with the connecting element 221 of the battery 220.

In some embodiments of the present application, a material of the oiling element 122 is sponge, felt or cotton cloth.

The sponge, the felt, the cotton cloth, or the like are common soft wetted elements, which can not only store the lubricating oil, but also extrude out the lubricating oil when being extruded, so as to lubricate the oiling element 122 with oil.

The oiling element 122 may be a single material, and may also be formed by compounding of various soft wetted elements. The oiling element 122 may be formed by stacking the plurality of layers of wetted elements, so as to have better elasticity and storage capacity. The oiling element can quickly return to the original shape after one-time oiling, and can further reduce the number of times of oil replenishment. For example, the oiling element 122 includes seven layers of felts stacked in a vertical direction, all the seven layers of felts are wetted with the lubricating oil, and the seven layers of felts are limited in the oiling cavity 1215 of the housing 121. The oiling element 122 may also include only one wetted element, which simplifies the structure of the oiling element 122 and makes the lubricating oil to wet the oiling element 122 substantially uniformly.

The sponge, the felt or the cotton cloth are all materials with strong water absorption, which can store a large amount of lubricating oil to effectively oil the connecting element 221, and can further reduce the number of times oil replenishment.

Figure 6:
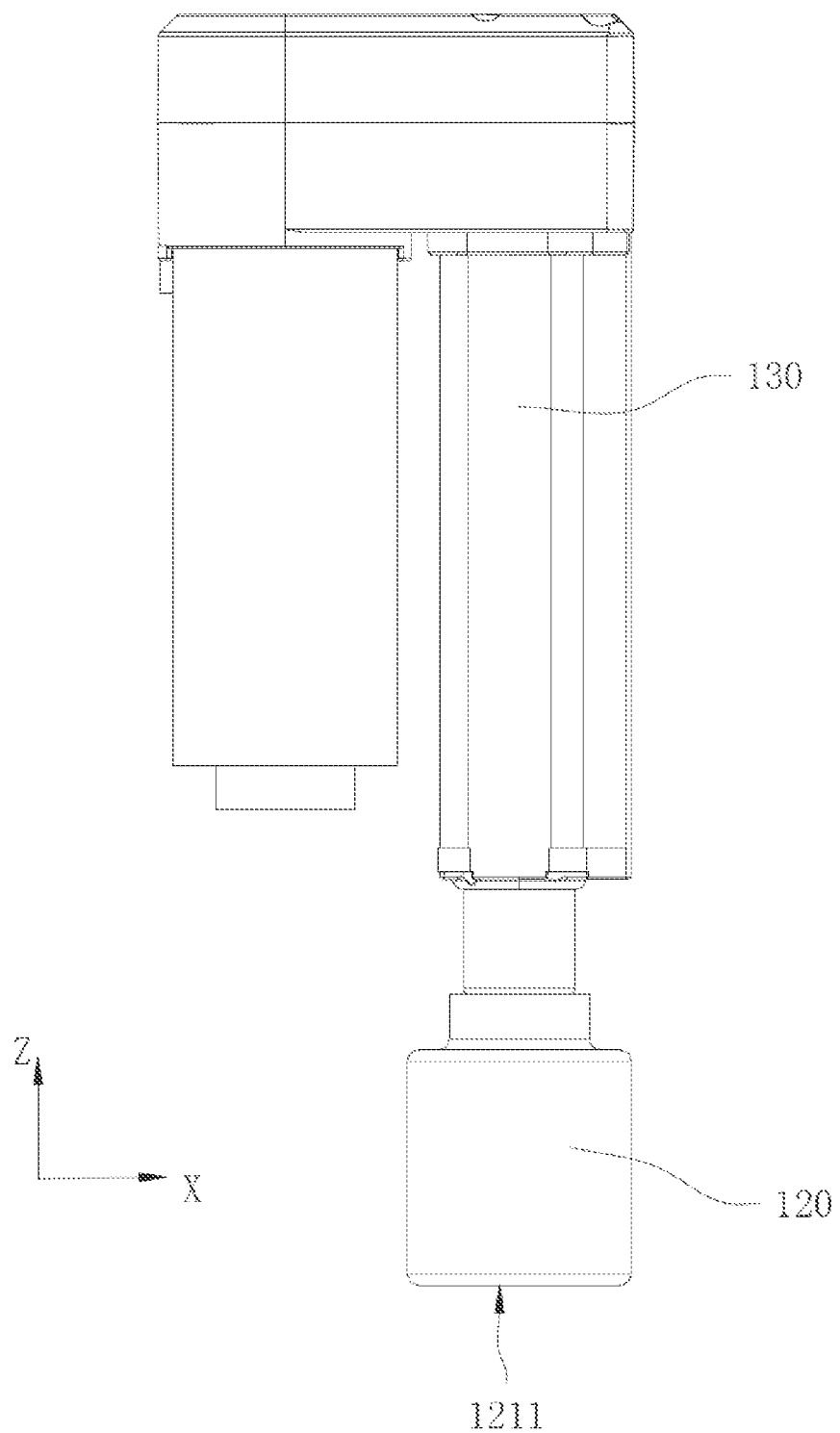
FIG. 6 shows a schematic structural diagram of connection between a driving mechanism and an oiling mechanism of a battery storage device provided by some embodiments of the present application.

FIG. 6 shows a schematic structural diagram of connection between a driving mechanism and an oiling mechanism of a battery storage device provided by some embodiments of the present application.

As shown in FIG. 1, FIG. 5 and FIG. 6, in some embodiments of the present application, the battery storage device 100 further includes: the driving mechanism 130, arranged on the battery placement rack 110, and the oiling mechanism 120 is connected to the output end of the driving mechanism 130. The driving mechanism 130 is used to drive the oiling mechanism 120 to move, so that the oiling mechanism 120 is switched between the working position and the non-working position.

As shown in FIG. 1, FIG. 5 and FIG. 6, in the oiling mechanism 120, the connecting portion 1212 of the housing 121 is fixedly connected to an output end of the driving mechanism 130, so that the oiling mechanism 120 is switched between the working position and the non-working position under the driving of the driving mechanism 130. When the oiling mechanism 120 is located in the working position, the oiling mechanism 120 is close to the connecting element 221 of the battery 220, and the connecting element 221 extends into the interior of the housing 121 from the opening 1211 to extrude the oiling element 122 and lubricate the connecting element 221 with the oil. When the oiling mechanism 120 is located in the non-working position, the oiling mechanism 120 is far away from the connecting element 221 of the battery 220, so that there is an enough space around the battery 220, and the battery 220 is placed in the battery placement rack 110 and taken out of the battery placement rack 110.

In other embodiments, the oiling mechanism 120 may be fixedly arranged on the battery placement rack 110, and the battery 220 is switched between an oiling position and a placement position by moving the battery 220. When the battery 220 is located in the oiling position, the connecting element 221 of the battery 220 extends into the interior of the housing 121, and the oiling element 122 oils the connecting element 221; and when the battery 220 is located in the placement position, the battery 220 is placed on the battery placement rack 110, the battery 220 is buffered in the battery placement rack 110, or the battery 220 is charged by using a charging module.

The driving mechanism 130 may be a linear cylinder, an electric push rod or other linear driving mechanisms 130. A moving direction of the oiling mechanism 120 may be perpendicular to the surface of the battery 220 to have the shortest moving path. Specifically, the connecting element 221 of the battery 220 protrudes upward from the surface of the battery 220 in the vertical direction (i.e., a third direction Z), and the driving mechanism 130 drives the oiling mechanism 120 to move in the third direction Z, so as to be switched between the working position and the non-working position.

The oiling mechanism 120 may also move in a direction inclined to a normal line of the surface of the battery 220; or the driving mechanism 130 is a six-axis manipulator, which can drive the oiling mechanism 120 to move flexibly, so as to avoid other structures on the surface the battery 220 in the process of switching to the working position.

In the above solution, through the driving mechanism 130, the oiling mechanism 120 can be driven to switch between the working position and the non-working position. When the oiling mechanism 120 is located in the working position, the oiling mechanism 120 oils the connecting element 221 of the battery 220; and when the oiling mechanism 120 is located in the non-working position, the oiling mechanism 120 is far away from the connecting element 221 of the battery 220, so as to avoid a space required when the battery 220 is loaded to the battery placement rack 110 and taken out of the battery placement rack 110.

Figure 7:
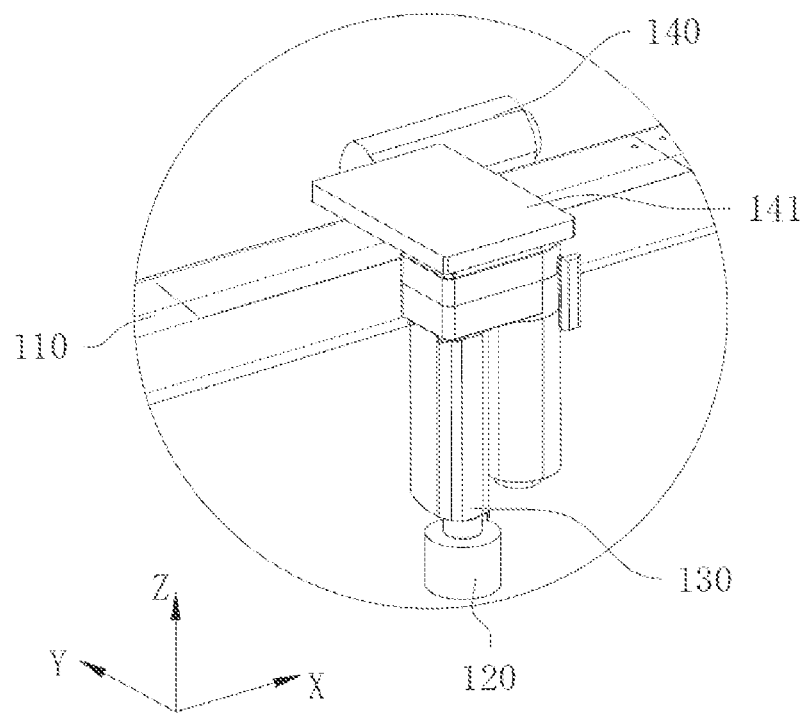
FIG. 7 shows a schematic diagram of a partial structure of a position adjustment mechanism in a battery storage device provided by some embodiments of the present application.

FIG. 7 shows a schematic diagram of a partial structure of a position adjustment mechanism in a battery storage device provided by some embodiments of the present application.

As shown in FIG. 7, in some embodiments of the present application, the battery storage device 100 further includes: the position adjustment mechanism 140 arranged on the battery placement rack 110, and the position adjustment mechanism 140 is used for adjusting a position of the driving mechanism 130 on the battery placement rack 110.

Due to the different specifications of the batteries 220, the positions of the connecting elements 221 of the batteries 220 may vary. By arranging the position adjustment mechanism 140, the battery storage device 100 can be made compatible with the batteries 220 of different specifications, and the connecting elements 221 of the battery storage device 100 can be oiled.

Specifically, an output end of the position adjustment mechanism 140 is connected to a first bracket 141, the first bracket 141 is slidably matched with the battery placement rack 110 in the first direction X through a guide rail, and the driving mechanism 130 is mounted on the first bracket 141. The position adjustment mechanism 140 is fixed to the battery placement rack 110 and can drive the driving mechanism 130 to move in the first direction X, so that the oiling mechanism 120 has a first position and a second position. The position adjustment mechanism 140 may be a linear cylinder, an electric push rod or other linear driving mechanisms 130.

In other embodiments, the position adjustment mechanism may also drive the driving mechanism 130 to move on an XY plane. For example, the position adjustment mechanism further includes a first linear driving element and a second linear driving element, the first linear driving element is fixed on the battery placement rack 110 and can drive the second linear driving element to move in the first direction X, the driving mechanism 130 is mounted at the output end of the second linear driving element, and can further drive the driving mechanism 130 to move in the second direction Y based on the output end of the first linear driving element, thereby driving the oiling mechanism 120 to have a plurality of positions on the XY plane.

In the above solution, the position of the driving mechanism 130 on the battery placement rack 110 can be adjusted through the position adjustment mechanism 140, thereby driving the oiling mechanism 120 to move relative to the battery placement rack 110, so that the oiling mechanism 120 has the plurality of working positions to adapt to the batteries 220 of different specifications.

Figure 8:
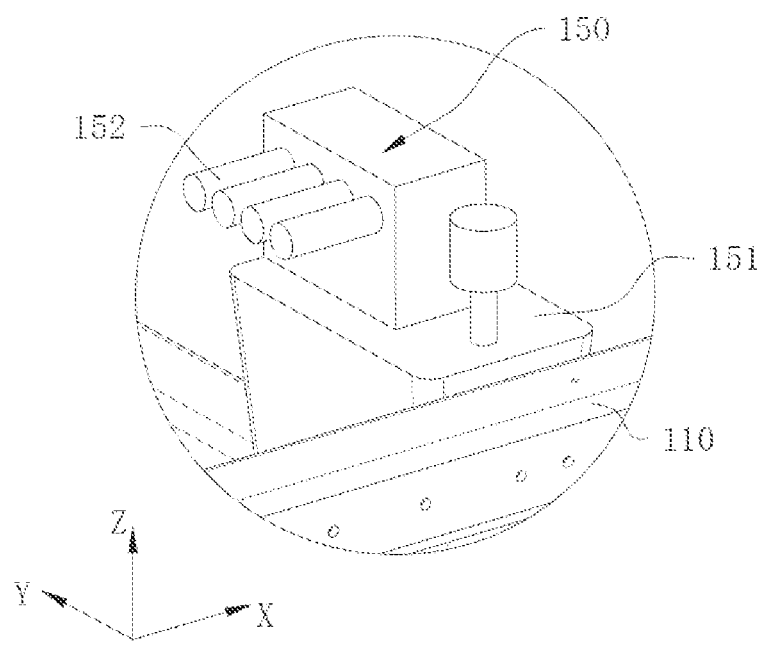
FIG. 8 shows a schematic structural diagram of connection between an oil replenishing mechanism and a battery placement rack of a battery storage device provided by some embodiments of the present application.

FIG. 8 shows a schematic structural diagram of connection between an oil replenishing mechanism and the battery placement rack of the battery storage device provided by some embodiments of the present application.

As shown in FIG. 1 and FIG. 8, in some embodiments of the present application, the battery storage device 100 further includes: the oil replenishing mechanism 150, arranged on the battery placement rack 110 and used to replenish oil for the oiling mechanism 120.

As shown in FIG. 8, the oil replenishing mechanism 150 is arranged on the battery placement rack 110, and the oil replenishing mechanism 150 may have various implementation forms. The oil replenishing mechanism 150 may include an oil filling device 151 and an oil replenishing pipe 152 to automatically replenish the oil to the oiling mechanism 120. The oil replenishing mechanism 150 may also be an oil storage container with an opening at the upper end, the oil storage container is movably mounted in the battery placement rack 110, and the oil storage container is switched between a retracted position and an oil replenishing position. When the oil storage container is located at the oil replenishing position, and when the oiling mechanism 120 is driven by the driving mechanism 130 to move to the working position, the oiling element 122 extends into the opening 1211 of the oil storage container and is immersed in the lubricating oil, so as to realize the oil replenishment of the oiling element 122.

In other embodiments, the oil replenishing mechanism 150 may also be arranged independently from the battery placement rack 110, and replenishes the oil to the oiling mechanism 120 with the aid of an external transfer mechanism or manually when the oil needs to be replenished.

In the above solution, by arranging the oil replenishing mechanism 150, the oil can be replenished for the oiling mechanism 120, so that the oiling element 122 has the enough lubricating oil, and when the oiling element 122 is in contact with the connecting element 221 of the battery 220, the connecting element 221 can be effectively oiled.

As shown in FIG. 8, in some embodiments of the present application, the oil replenishing mechanism 150 includes the oil filling device 151 and the oil replenishing pipe 152, and the oil filling device 151 is arranged on the battery placement rack 110. Two ends of the oil replenishing pipe 152 respectively communicate with the oil filling device 151 and the oiling mechanism 120, and the oil filling device 151 is configured to fill the oil to the oiling mechanism 120 through the oil replenishing pipe 152.

Specifically, the oil filling device 151 generally includes a spray pipe, a mixing chamber, and a diffuser pipe. The pressure is accelerated in the spray pipe through a main oil pump, thereby forming a negative pressure in the mixing chamber. The oil in the mixing chamber enters the diffuser pipe under the action of the negative pressure and entrainment of a free plume, and enters the oil filling port 1213 through the oil filling pipe 152 after decelerating and boosting in the diffuser pipe (please refer to FIG. 5). The oil filling device 151 is a common oil supply device, which will not be further described here.

The oil filling device 151 may be configured to perform one-time oil replenishing action before each oiling of the oiling mechanism 120, so as to ensure that the oiling element 122 contains enough lubricating oil during each time of oiling. The oiling device 151 may also be configured to perform one-time oil replenishing action after the oiling mechanism 120 completes several oiling actions so as to reduce the number of times of oil replenishment. For example, the oil replenishing mechanism 150 may include a counter, the counter takes the number of execution times of the driving mechanism 130 as a counting unit, and sends an oil replenishing signal when the counted number of execution times of the driving mechanism is one or several preset number of times, and the oil filling device 151 responds to the oil replenishment signal and replenishes the oil replenishing mechanism 150 with the oil. For another example, the counter takes time as the counting unit, and sends the oil replenishing signal every predetermined time, and the oil filling device 151 responds to the oil replenishing signal and replenishes the oil replenishing mechanism 150 with the oil.

Based on the aforementioned implementation of "four oiling mechanisms 120 are arranged", the oil filling device 151 is used to replenish the oil to the four oiling mechanisms 120 at the same time. There are four oil replenishing pipes 152, and the oil replenishing pipes 152 are in one-to-one correspondence with the oiling mechanism 120.

In the above solution, the oil filling device 151 fills the oil into the oiling mechanism 120 through the oil replenishing pipe 152, which can realize automatic oil replenishing and improve the oil replenishing efficiency of the oiling mechanism 120, and the lubricating oil will not drip and pollute the external environment.

Figure 9:
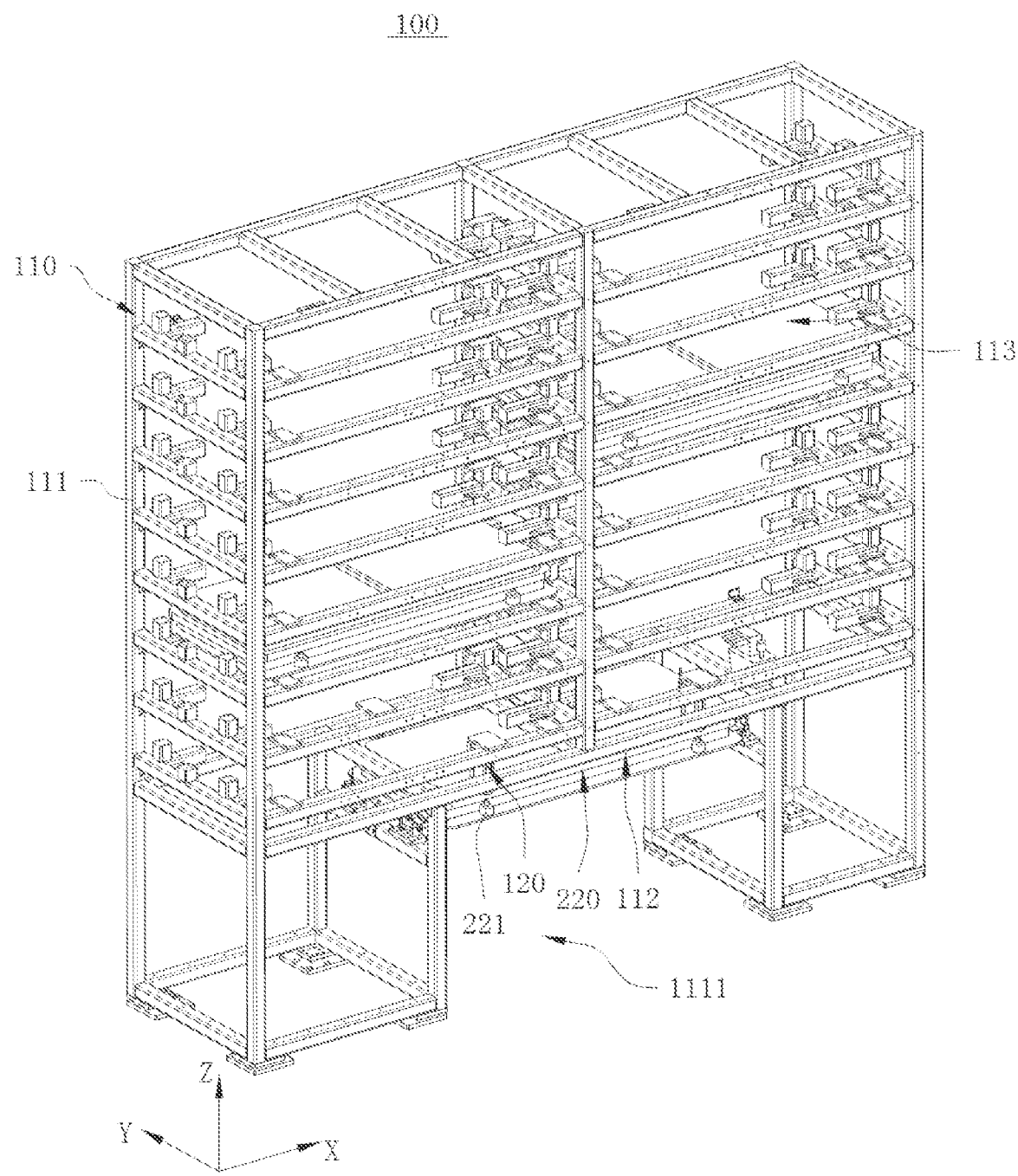
FIG. 9 and FIG. 10 respectively show schematic structural diagrams of a second form of battery storage device provided by some embodiments of the present application from two perspectives.
Figure 10:
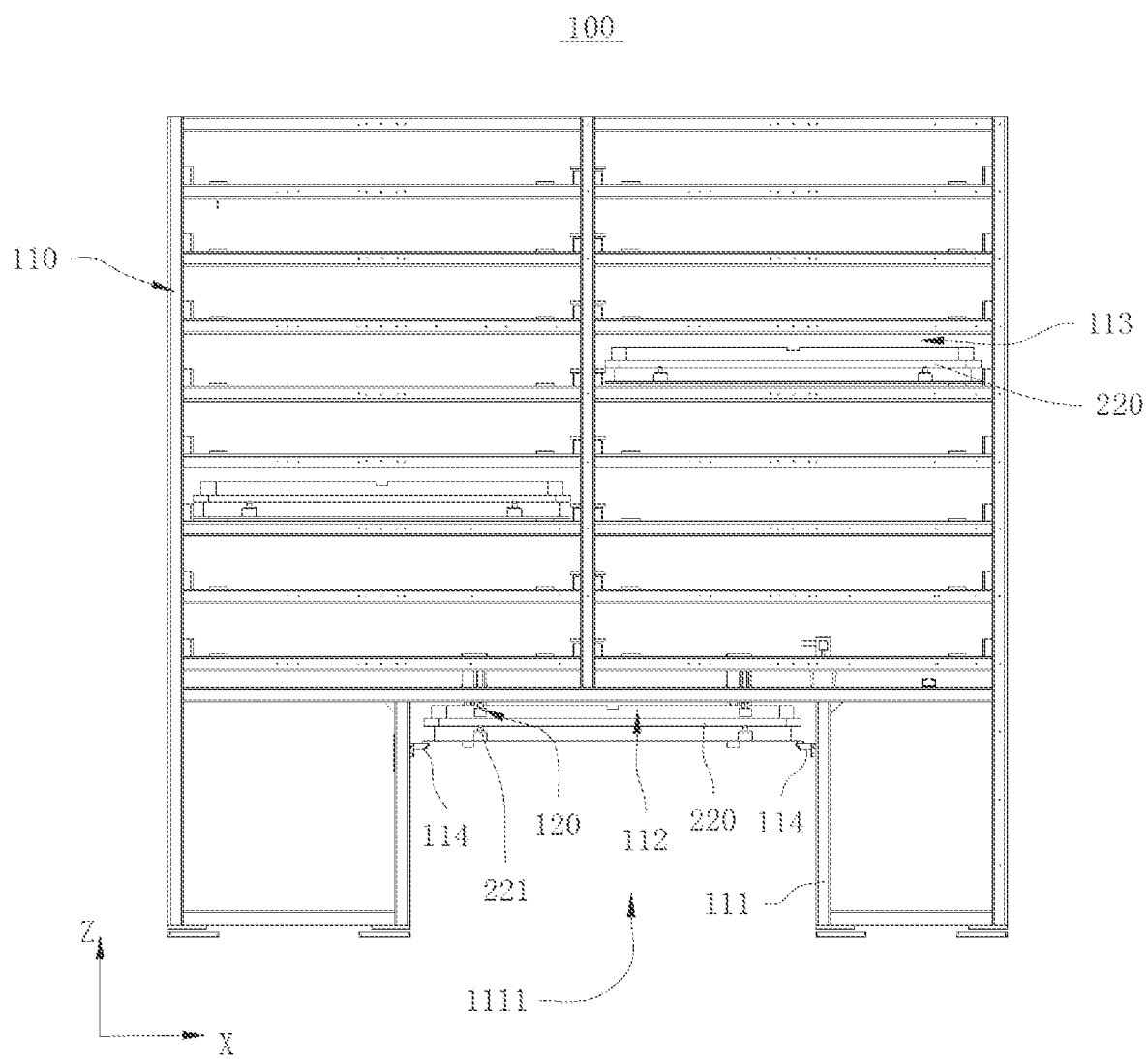

FIG. 9 and FIG. 10 respectively show schematic structural diagrams of the second form of battery storage device provided by some embodiments of the present application from two perspectives.

As shown in FIG. 9 and FIG. 10, in some embodiments of the present application, the battery placement rack 110 has a buffer compartment 112 and a charging compartment 113, the buffer compartment 112 is used to store the battery 220, and the charging compartment 113 is used for storing the battery 220 and charging the battery 220. The oiling mechanism 120 is arranged on the buffer compartment 112.

Specifically, the battery placement rack 110 includes a rack body 111, the rack body 111 has one buffer compartment 112 and the plurality of charging compartments 113, the buffer compartment 112 is used to store the battery 220, the oiling mechanism 120 is arranged in the buffer compartment 112, and the charging module is used for charging the batteries 220 placed in the charging compartments 113.

The positional arrangement form of the buffer compartment 112 and the charging compartment 113 has various implementations. For example, an operation space 1111 is reserved at the bottom of the rack body 111, the buffer compartment 112 is arranged above the operation space 1111, and the operation space 1111 is used to provide a space for the second transfer mechanism, so that the second transfer mechanism first transfers the battery 220 to the operation space 1111, and then drive the second transfer mechanism to move upwards to the buffer compartment 112.

The buffer compartment 112 is further provided with a plurality of lifting assemblies 114, and the plurality of lifting assemblies 114 are fixed to the battery placement rack 110 for jointly lifting the battery 220 placed in the buffer compartment 112. The lifting assemblies 114 can be turned over to allow the battery 220 to pass through the operation space 1111 from bottom to top. When the battery 220 passes through the lifting assemblies 114, the lifting assemblies 114 is reset to lift the battery 220. For example, the quantity of the lifting assemblies 114 may be four, wherein the two lifting assemblies 114 are used to lift the battery 220 from one side of a length direction of the battery 220 (i.e., the first direction X), and the other two lifting assemblies 114 are used to lift the battery 220 from the other side in the length direction of the battery 220.

Figure 11:
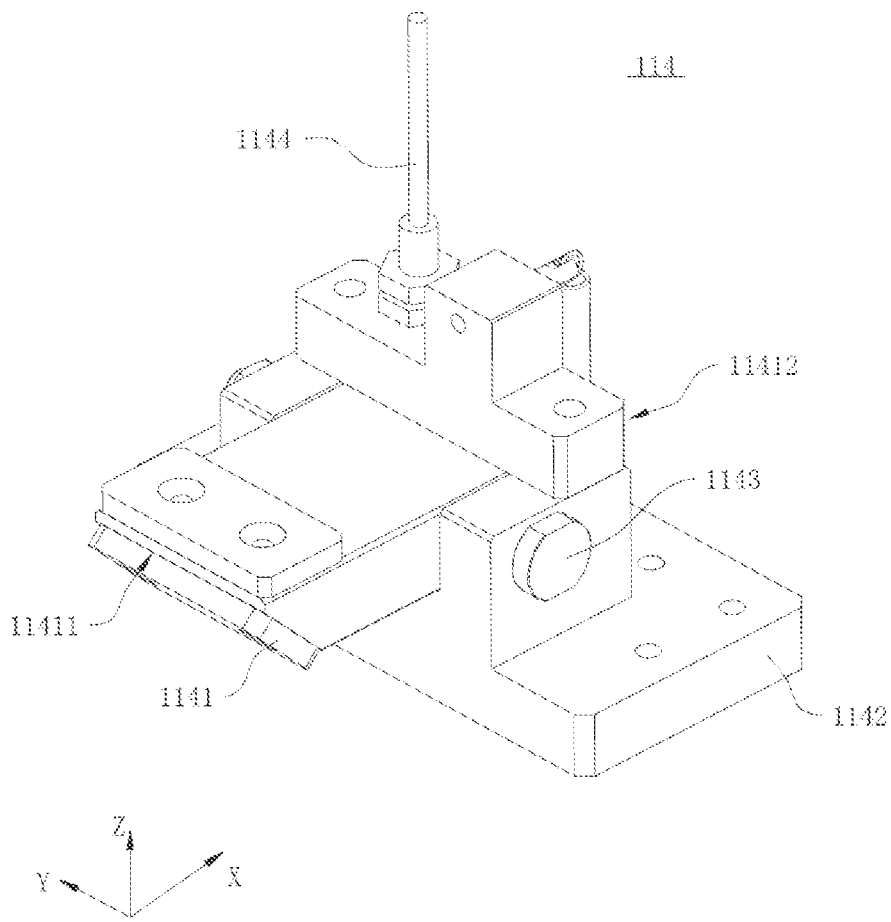
FIG. 11 shows a schematic structural diagram of a lifting assembly of a second form of battery storage device provided by some embodiments of the present application.

FIG. 11 shows a schematic structural diagram of the lifting assembly of the second form of battery storage device provided by some embodiments of the present application.

As shown in FIG. 10 and FIG. 11, the lifting assembly 114 includes a second bracket 1142, a lifting block 1141 and a rotating shaft 1143. The lifting block 1141 is rotatably mounted on the second bracket 1142 through the rotating shaft 1143, the second bracket 1142 is fixedly mounted on the battery placement rack 110, and two ends of the lifting block 1141 relative to the rotating shaft 1143 are a first end 11411 and a second end 11412 respectively. The first end 11411 is used to lift the battery 220, and a center of gravity of the lifting block 1141 is close to the first end 11411. When the battery 220 passes through the lifting block 1141 from bottom to top, the first end 11411 of the lifting block 1141 rotates downward under the action of gravity, a lower side of the first end 11411 abuts against the second bracket 1142, and an upper side of the first end 11411 is used to lift the battery 220.

The lifting assembly 114 further includes an in-place sensor 1144, which is used to detect that the battery 220 is placed in place and send an oiling signal. The driving mechanism 130 responds to the oiling signal to move the oiling mechanism 120 to the working position, and the oiling mechanism 120 is used for oiling the connecting element 221.

The lifting assembly 114 further includes a return spring, two ends of the return spring are respectively connected to the second bracket 1142 and the second end 11412 of the lifting block 1141, and the return spring is in a compressed state to abut the first end 11411 of the lifting block 1141 against the second bracket 1142.

In other embodiments, the oiling mechanism 120 may also be arranged in the charging compartment 113 to oil the connecting element 221 during the charging process of the battery 220 so as to provide sufficient oiling time.

The buffer compartment 112 is provided with the oiling mechanism 120, and the oiling mechanism 120 oils the connecting element 221 of the battery 220 placed in the buffer compartment 112, which can not only reduce the arrangement quantity of the oiling mechanism 120, but also make the oiling mechanism 120 be arranged far away from the charging module related to the charging compartment 113, thereby improving safety of the battery storage device 100.

Figure 12:
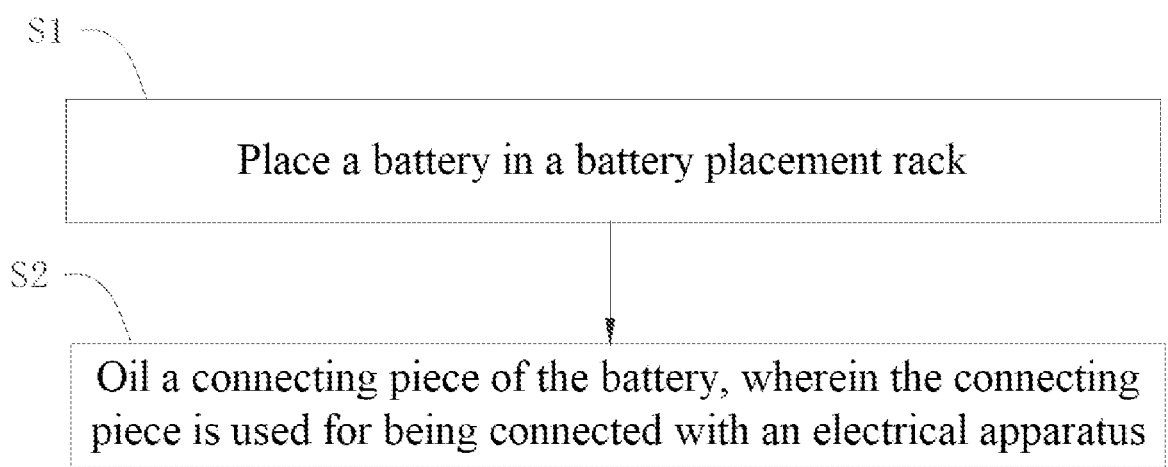
FIG. 12 shows a step diagram of a first form of oiling method provided by some embodiments of the present application.

FIG. 12 shows a step diagram of a first form of oiling method provided by some embodiments of the present application.

Some embodiments of the present application provide an oiling method, including:
S1: a battery 220 is placed on a battery placement rack 110; and
S2: a connecting element 221 of the battery 220 is oiled, and the connecting element 221 is used to be connected to an electrical apparatus.

The oiling method provided in the embodiment of the present application can be implemented by using the battery storage device 100 in the embodiment of the present application, and is not limited to being implemented only by using the battery storage device 100 in the embodiment of the present application. For the convenience of description, the specific implementation steps of the oiling method are described in detail by taking the battery storage device 100 in the embodiment of the present application as an example.

Figure 13:
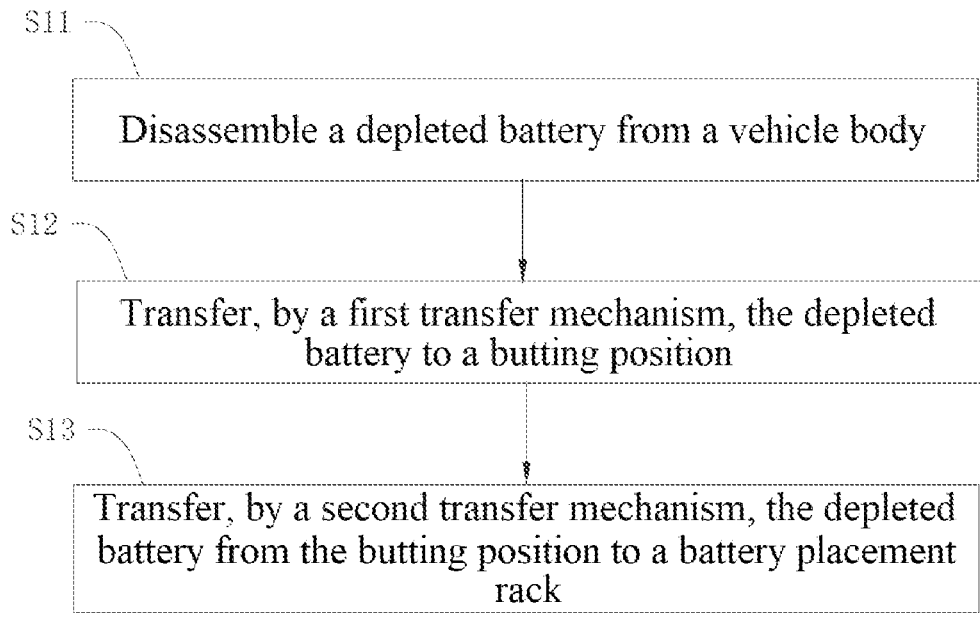
FIG. 13 shows a step diagram of a second form of oiling method provided by some embodiments of the present application.

FIG. 13 shows a step diagram of a second form of oiling method provided by some embodiments of the present application.

As shown in FIG. 13, the step of "S1: placing the battery 220 on the battery placement rack 110" specifically includes:
S11: the connecting element 221 of the depleted battery 220 is separated from a fixing element of a vehicle 200, and the battery 220 is disassembled from a vehicle body 210;
S12: a first transfer mechanism transfers the depleted battery 220 to a butting position; and
S13: a second transfer mechanism takes out the depleted battery 220 from the butting position, and places it on the battery placement rack 110.

Figure 14:
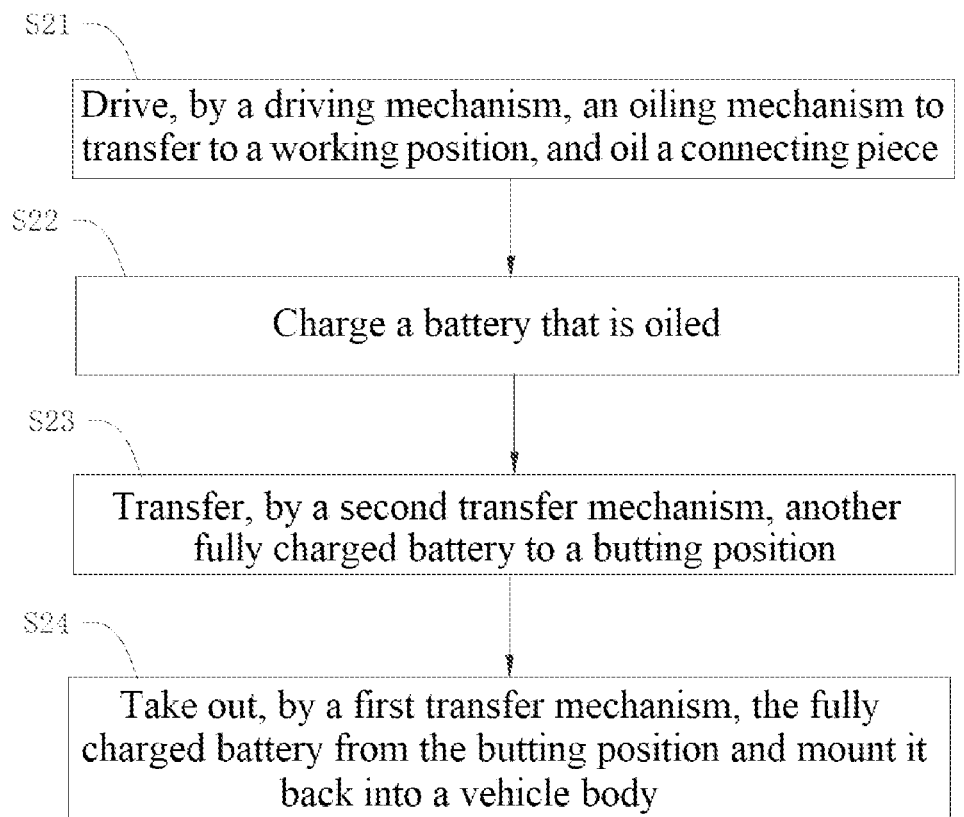
FIG. 14 shows a step diagram of a third form of oiling method provided by some embodiments of the present application.

FIG. 14 shows a step diagram of a third form of oiling method provided by some embodiments of the present application.

As shown in FIG. 14, the step of "S2: oiling the connecting element 221 of the battery 220, wherein the connecting element 221 is used to be connected to the electrical apparatus" specifically includes:
S21: a driving mechanism 130 drives the oiling mechanism 120 to move to a working position, so that the connecting element 221 extends into an opening 1211 of a housing 121, and the connecting element 221 extrudes an oiling element 122 to oil the connecting element 221 of the battery 220;
S22: after oiling is finished, a charging module is used to charge the depleted battery 220;
S23: the second transfer mechanism is used to take out another fully charged battery 220, and transfers it to the butting position; and
S24: the first transfer mechanism takes out the battery 220 from the butting position, and mounts the battery 220 on the vehicle body.

The battery 220 is placed on the battery placement rack 110, and the oiling mechanism 120 is used to oil the connecting element 221 of the battery 220, which can lubricate and maintain the connecting element 221 of the battery 220 and prolong the service life of the connecting element 221. After the battery 220 is disassembled from the vehicle body 210, not only the connecting element 221 is oiled, but also the battery 220 is charged, so that the number of times of disassembly and assembly of the battery 220 and the vehicle body 210 can be reduced, aging and wear of the connecting element 221 are alleviated, and the service life of the connecting element 221 is prolonged.

In some embodiments of the present application, the battery placement rack 110 has a buffer compartment 112 and a charging compartment 113, the buffer compartment 112 is used to store the battery 220, and the charging compartment 113 is used for storing the battery 220 and charging the battery 220. The oiling method includes: when the battery 220 is placed in the buffer compartment 112, the connecting element 221 is oiled.

Figure 15:
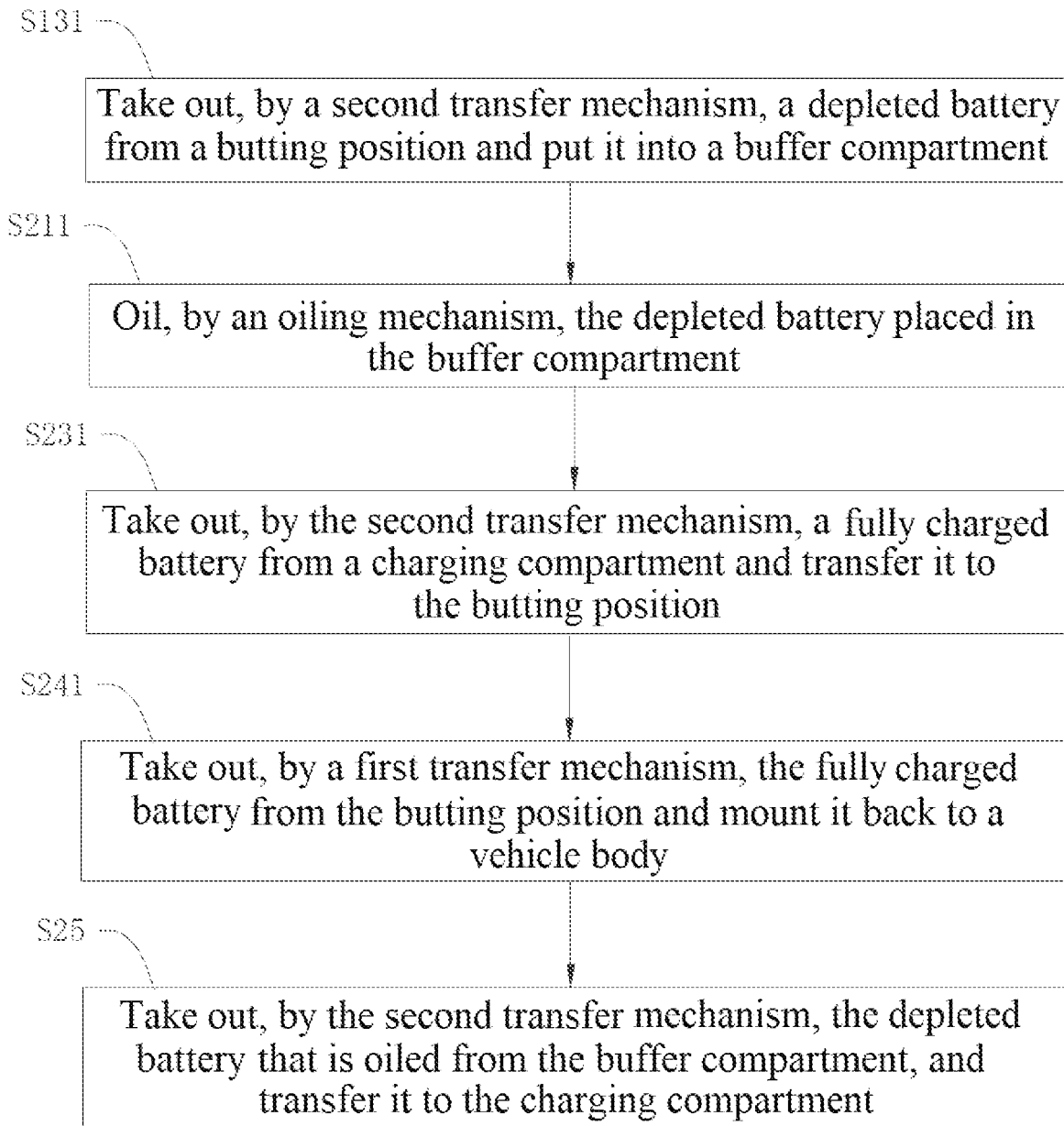
FIG. 15 shows a step diagram of a fourth form of oiling method provided by some embodiments of the present application.

FIG. 15 shows a step diagram of a fourth form of oiling method provided by some embodiments of the present application.

As shown in FIG. 15, the oiling method specifically includes:
S131: the second transfer mechanism takes out the depleted battery 220 from the butting position, and puts it into the buffer compartment 112;
S211: for the battery 220 placed in the buffer compartment 112, the driving mechanism 130 drives the oiling mechanism 120 to move to the working position, so that the connecting element 221 extends into the opening 1211 of the housing 121, and the connecting element 221 extrudes the oiling element 122 to oil the connecting element 221 of the battery 220;

S231: the second transfer mechanism takes out one fully charged battery 220 from the charging compartment 113, and places it on an execution end of the first transfer mechanism located at the butting position;

S241: the first transfer mechanism takes out the fully charged battery 220 from the butting position, and mounts the fully charged battery 220 back into the vehicle body 210; and S25: the second transfer mechanism returns to the buffer compartment 112, takes out the depleted battery 220 that is oiled from the buffer compartment 112, and transfers it to an empty charging compartment 113, and the oiled battery 220 is charged into the fully charged battery 220 in the charging compartment 113 and is ready to be taken by the second transfer mechanism next time.

The buffer compartment 112 is provided with the oiling mechanism 120, and the oiling mechanism 120 oils the connecting element 221 of the battery 220 placed in the buffer compartment 112, which can not only reduce the arrangement quantity of the oiling mechanism 120, but also make the oiling mechanism 120 be arranged far away from the charging module related to the charging compartment 113, thereby improving safety of the battery storage device 100.

As shown in FIG. 1 to FIG. 15, some embodiments of the present application provide a battery storage device 100 applied to a battery replacement station. The battery storage device 100 includes a battery placement rack 110, an oiling mechanism 120, a driving mechanism 130, an oil replenishing mechanism 150, a first transfer mechanism, a second transfer mechanism, a battery replacement platform, and a charging module. The battery placement rack 110 includes one buffer compartment 112 and a plurality of charging compartments 113. The buffer compartment 112 is arranged at a center of the battery placement rack 110, and a lifting assembly 114 is arranged in the buffer compartment 112. The first transfer mechanism is a battery replacement RGV trolley, and the second transfer mechanism is a fork. The battery 220 is a lithium battery pack. A locking mechanism is arranged on the lithium battery pack. The locking mechanism includes a lock body shell and a lock body screw. By locking or disassembling the lock body screw on the lock body mechanism and a vehicle body nut, the lithium battery 220 pack and a vehicle body 210 are fixed or separated.

When a battery of a vehicle needs to be replaced, the vehicle is parked on a battery-replacement platform, the depleted battery 220 disassembled from the vehicle body is first moved by the battery-replacement RGV trolley to directly below the buffer compartment 112, and then the battery-replacement RGV trolley lifts the battery 220 upwards. When a height exceeds the lifting assembly 114, the battery-replacement RGV trolley lowers the height, and the battery 220 is lifted by a lifting block 1141 to realize buffer of the battery 220. Afterwards, the fork places the fully charged battery 220 on the battery-replacement RGV trolley, and the battery-replacement RGV trolley moves the fully charged battery 220 to a bottom of the vehicle body for mounting. At the same time when the fully charged batteries 220 are interacting, the oiling mechanism 120 synchronously performs an oiling action on the battery 220 in the buffer compartment 112. The oiling mechanism 120 and the oil replenishing mechanism 150 are arranged above the buffer compartment 112, the oiling mechanism 120 includes a wool felt wetted with lubricating oil, and the oil replenishing mechanism 150 includes an oil filling device 151. The oil filling device 151 and the oiling mechanism 120 communicate with each other through an oil replenishing pipe 152 to realize automatic quantitative replenishment of lubricating oil. A position and quantity of the oiling mechanism 120 correspond to the lock body screws of the battery 220. After the battery 220 is stored in the buffer compartment 112, a telescopic cylinder drives the oiling mechanism 120 to extend and move to the working position, and apply the lubricating oil on the lock body screw. Each time the battery replacement action is implemented, the depleted battery 220 that is currently disassembled from the vehicle body can be oiled once. After oiling is finished, the fork carries the battery 220 to the empty charging compartment 113 for charging.

The lock body screw of the battery 220 is oiled by the battery storage device 100 in the embodiment of the present application to reduce the number of times of disassembly and assembly of the battery 220 and the vehicle body 210, alleviate the aging and wear of the connecting element 221, and prolong the service life of the connecting element 221.

It should be noted that in case of no conflicts, the features in the embodiments of the present application can be combined with each other.

The above are only preferred embodiments of the present application, and are not intended to limit the present application. For those skilled in the art, the present application may have various modifications and changes. Any modifications, equivalent replacements, improvements, etc. made within the spirit and principle of the present application shall be included within the scope of protection of the present application.

What is claimed is:

1. A battery storage device, in which a battery is storable and chargeable, the battery having a connecting element for being connected to an electrical apparatus, wherein the battery storage device comprises:
   a battery placement rack;
   an oiling mechanism, arranged on the battery placement rack and configured to oil the connecting element; and
   a driving mechanism arranged on the battery placement rack, wherein the oiling mechanism is connected to an output end of the driving mechanism, and the driving mechanism is used for driving the oiling mechanism to move, so as to switch the oiling mechanism between a working position and a non-working position,
   wherein the oiling mechanism comprises a housing and an oiling element, the oiling element is arranged in the housing, and the housing has an opening into which the connecting element extends, and
   wherein a material of the oiling element is sponge, felt, or cotton cloth.

2. The battery storage device according to claim 1, wherein the housing is provided with an oil filling port for filling oil into the housing to wet the oiling element.

3. The battery storage device according to claim 1, further comprising:
   a position adjustment mechanism, arranged on the battery placement rack, and used to adjust a position of the driving mechanism on the battery placement rack.

4. The battery storage device according to claim 1, further comprising:
   an oil replenishing mechanism, arranged on the battery placement rack and used for replenishing oil for the oiling mechanism.

5. The battery storage device according to claim 4, wherein the oil replenishing mechanism comprises:
- an oil filling device, arranged on the battery placement rack; and
- an oil replenishing pipe, with two ends thereof respectively communicating with the oil filling device and the oiling mechanism, wherein the oil filling device is configured to fill oil into the oiling mechanism through the oil replenishing pipe.

6. The battery storage device according to claim 1, wherein there are multiple oiling mechanisms, and each oiling mechanism corresponds to one connecting element of the battery.

7. The battery storage device according to claim 1, wherein the battery placement rack has a buffer compartment and a charging compartment, the buffer compartment is used for storing the battery, the charging compartment is used for storing the battery and charging the battery, and the oiling mechanism is arranged in the buffer compartment.

8. A battery storage device, used for storing a battery and charging the battery, the battery having a connecting element for being connected to an electrical apparatus, wherein the battery storage device comprises:
- a battery placement rack;
- an oiling mechanism, arranged on the battery placement rack and configured to oil the connecting element; and
- a driving mechanism arranged on the battery placement rack, wherein the oiling mechanism is connected to an output end of the driving mechanism, and the driving mechanism is used for driving the oiling mechanism to move, so as to switch the oiling mechanism between a working position and a non-working position, wherein the oiling mechanism comprises a housing and an oiling element, the oiling element is arranged in the housing, and the housing has an opening into which the connecting element extends, wherein the housing is provided with an oil filling port for filling oil into the housing to wet the oiling element, and wherein a material of the oiling element is sponge or felt.

9. The battery storage device according to claim 7, wherein:
- the buffer compartment further includes a plurality of lifting assemblies,
- the plurality of lifting assemblies being fixed to the battery placement rack and configured to jointly lift the battery in the buffer compartment.

* * * * *